(12) United States Patent
Byers et al.

(10) Patent No.: US 8,479,261 B2
(45) Date of Patent: Jul. 2, 2013

(54) IMPLEMENTING ELECTRONIC CHIP IDENTIFICATION (ECID) EXCHANGE FOR NETWORK SECURITY

(75) Inventors: Marcy E. Byers, Rochester, MN (US); William T. Flynn, Rochester, MN (US); Kenneth M. Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 12/779,089

(22) Filed: May 13, 2010

(65) Prior Publication Data

US 2011/0283029 A1    Nov. 17, 2011

(51) Int. Cl.
*G06F 15/16*    (2006.01)
*H04L 9/32*    (2006.01)
*H04L 12/28*    (2006.01)
*G06F 15/173*    (2006.01)

(52) U.S. Cl.
USPC .................. 726/3; 726/6; 713/180; 709/223; 709/224; 370/389

(58) Field of Classification Search
USPC .. 713/168–174, 182–186, 202; 709/225–229; 726/2–8
See application file for complete search history.

(56) References Cited

U.S. PATENT DOCUMENTS

2008/0275975 A1\* 11/2008 Pandey et al. ................. 709/223
2009/0249444 A1\* 10/2009 Macauley .......................... 726/3
2009/0249457 A1\* 10/2009 Graff et al. ........................ 726/6

\* cited by examiner

*Primary Examiner* — Evans Desrosiers
(74) *Attorney, Agent, or Firm* — Joan Pennington

(57) ABSTRACT

A method and circuit for implementing electronic chip identification (ECID) exchange for network security in an interconnect system, and a design structure on which the subject circuit resides are provided. Each interconnect chip includes an ECID for the interconnect chip, each ECID is unique and is permanently stored on each interconnect chip. Each interconnect chip sends predefined exchange identification (EXID) messages including the ECID across links to other interconnect chips in the interconnect system. Each interconnect chip compares a received EXID with a system list for the interconnect system to verify validity of the sending interconnect chip.

14 Claims, 9 Drawing Sheets

EXID FORMAT
300

| WORD | BYTE 0 | BYTE 1 | BYTE 2 | BYTE 3 |
|---|---|---|---|---|
| 0 | CHIP ECID (31:0) | | | |
| 1 | CHIP ECID (63:32) | | | |
| 2 | CHIP ECID (95:64) | | | |
| 3 | CHIP ECID (127:96) | | | |
| 4 | SOFTWARE WRITEABLE (31:0) | | | |
| 5 | SOFTWARE WRITEABLE (32:63) | | | |
| 6 | CHIP ID (8:0) & "0000000" | | PORT(4:0) & "000" | "00000000" |

FIG. 3

IMPLEMENTING ELECTRONIC CHIP IDENTIFICATION (ECID) EXCHANGE FOR NETWORK SECURITY

FIELD OF THE INVENTION

The present invention relates generally to the data processing field, and more particularly, relates to a method and circuit for implementing electronic chip identification (ECID) exchange for network security in an interconnect system, and a design structure on which the subject circuit resides.

DESCRIPTION OF THE RELATED ART

It is desirable to replace multiple interconnects, such as Ethernet, Peripheral Component Interconnect Express (PCIe), and Fibre channel, within a data center by providing one local rack interconnect system. The local rack interconnect system is used to transfer packets from a source high bandwidth device, such as either a central processor unit (CPU) or an input/output (I/O) adapter, to a destination high bandwidth device, for example, either a CPU or I/O adapter, using one or more hops across lower bandwidth links in the interconnect system.

When building an interconnect system or network it is important to provide security for the interconnect system or network. Protecting a system from a software only attack greatly reduces the security risk throughout the interconnect system or network.

A need exists for an effective method and circuit to implement network security in an interconnect system. It is desirable to provide such method and circuit that effectively and efficiently confirms validity and trust of a plurality of interconnect chips in the interconnect system.

SUMMARY OF THE INVENTION

Principal aspects of the present invention are to provide a method and circuit for implementing electronic chip identification (ECID) exchange for network security in an interconnect system, and a design structure on which the subject circuit resides. Other important aspects of the present invention are to provide such method, circuitry, and design structure substantially without negative effect and that overcome many of the disadvantages of prior art arrangements.

In brief, a method and circuit for implementing electronic chip identification (ECID) exchange for network security in an interconnect system, and a design structure on which the subject circuit resides are provided. Each interconnect chip includes an ECID for the interconnect chip, each ECID is unique and is permanently stored on each interconnect chip. Each interconnect chip sends predefined exchange identification (EXID) messages including the ECID across links to other interconnect chips in the interconnect system. Each interconnect chip compares a received EXID with a system list for the interconnect system to verify validity of the sending interconnect chip.

In accordance with features of the invention, a respective network manager on each interconnect chip sends an ECID exchange across links to the other interconnect chips in the interconnect system. The network manager of each interconnect chip includes a register storing the ECID for the interconnect chip, which also is permanently stored on-chip and is unique. The ECID is a non-modifiable part of the security exchange.

In accordance with features of the invention, the network manager periodically transmits EXID on disabled ports that have a good link heartbeat. Port logic receives the EXID with good CRC and sends a notification for validity checking of the received EXID.

In accordance with features of the invention, when the received ECID is identified as valid, a port enable configuration bit is written to enable the sending interconnect chip. When the received ECID is not identified as valid, the port remains disabled for the sending interconnect chip. An alert is sent to a chassis service processor responsive to the received ECID being invalid.

In accordance with features of the invention, the ECID is permanently stored on-chip into electrically-programmable fuses, for example, during wafer test. The binary data is unique for each interconnect chip produced and is directly available as parallel outputs.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 illustrates an example predefined exchange identification (EXID) format for messages including the ECID used for network security in the interconnect system in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, circuits and methods are provided for implementing electronic chip identification (ECID) exchange for network security in an interconnect system.

Figure 1A:
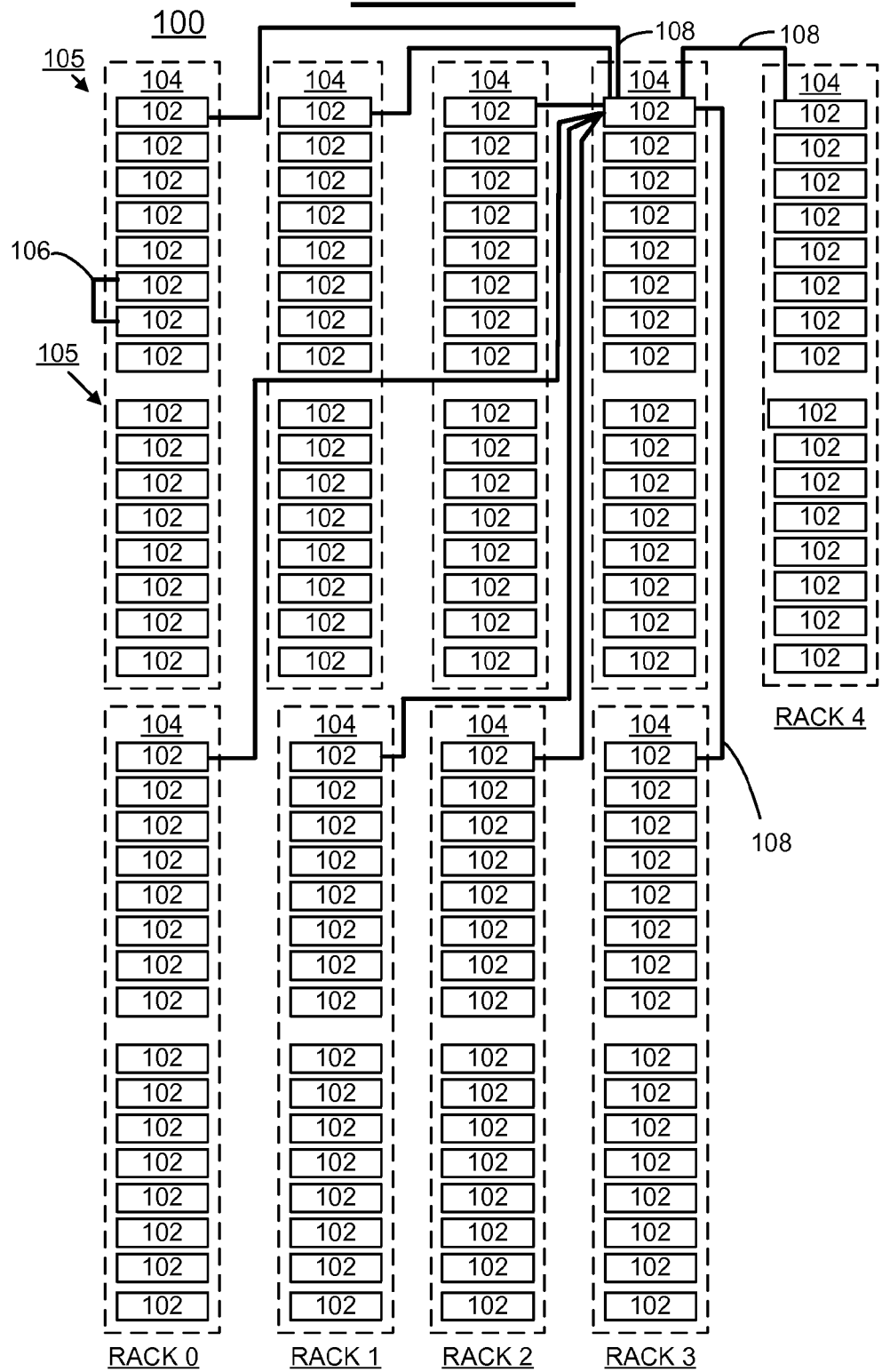
FIGS. 1A, 1B, 1C, 1D, and 1E are respective schematic and block diagrams illustrating an exemplary a local rack interconnect system for implementing electronic chip identification (ECID) exchange for network security in the interconnect system in accordance with the preferred embodiment.

Having reference now to the drawings, in FIG. 1A, there is shown an example multiple-path local rack interconnect system generally designated by the reference character 100 used for electronic chip identification (ECID) exchange for network security in an interconnect system in accordance with the preferred embodiment. The multiple-path local rack interconnect system 100 supports computer system communications between multiple servers, and enables an Input/Output (IO) adapter to be shared across multiple servers. The multiple-path local rack interconnect system 100 supports network, storage, clustering and Peripheral Component Interconnect Express (PCIe) data traffic.

The multiple-path local rack interconnect system 100 includes a plurality of interconnect chips 102 in accordance with the preferred embodiment arranged in groups or super nodes 104. Each super node 104 includes a predefined number of interconnect chips 102, such as 16 interconnect chips, arranged as a chassis pair including a first and a second chassis group 105, each including 8 interconnect chips 102. The multiple-path local rack interconnect system 100 includes, for example, a predefined maximum number of nine super nodes 104. As shown, a pair of super nodes 104 are provided within four racks or racks 0-3, and a ninth super node 104 is provided within the fifth rack or rack 4.

In FIG. 1A, the multiple-path local rack interconnect system 100 is shown in simplified form sufficient for understanding the invention, with one of a plurality of local links (L-links) 106 shown between a pair of the interconnect chips 102 within one super node 104. The multiple-path local rack interconnect system 100 includes a plurality of L-links 106 connecting together all of the interconnect chips 102 of each super node 104. A plurality of distance links (D-links) 108, or as shown eight D-links 108 connect together the example nine super nodes 104 together in the same position in each of the other chassis pairs. Each of the L-links 106 and D-links 108 comprises a bi-directional (x2) high-speed serial (HSS) link.

Figure 1B:
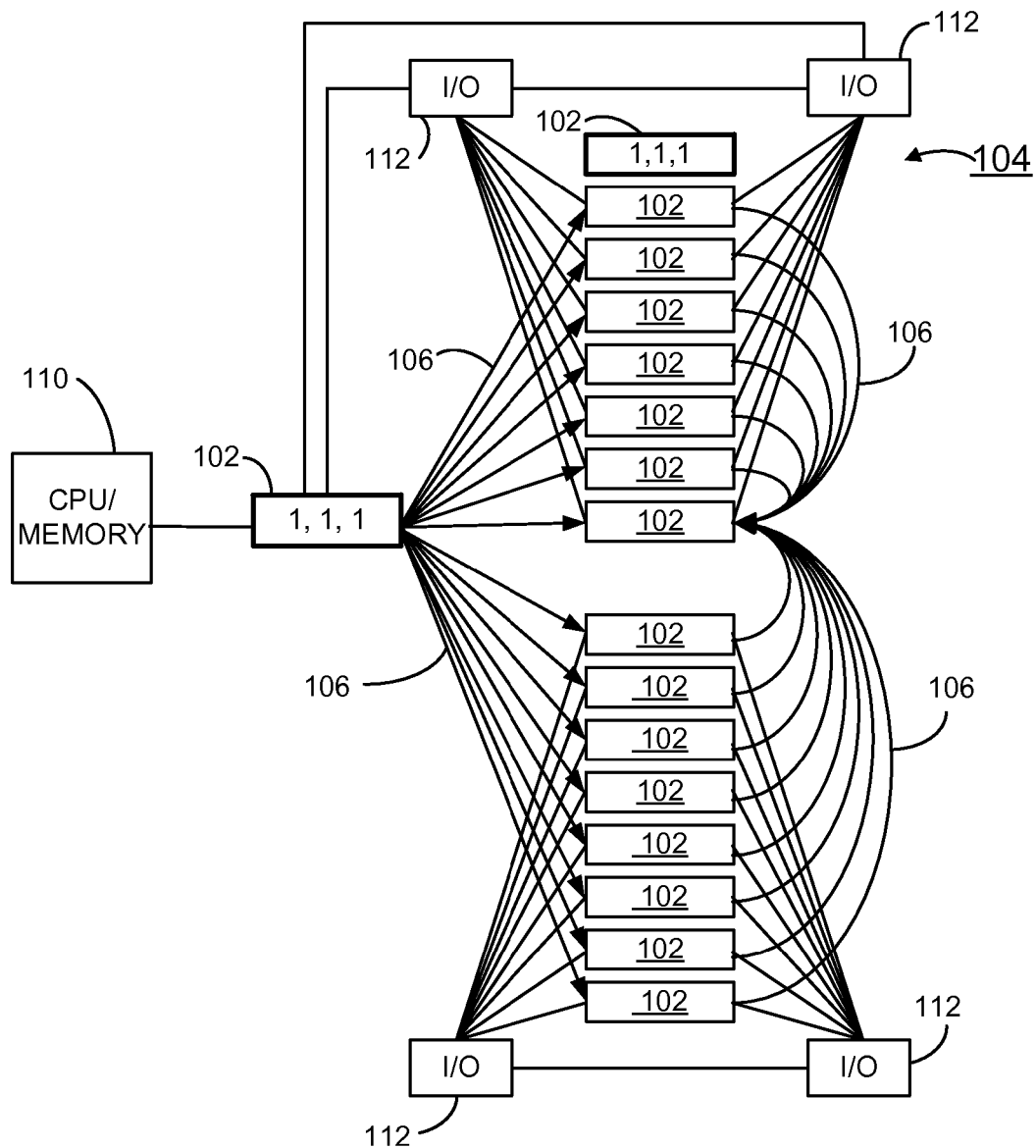
Figure 1C:
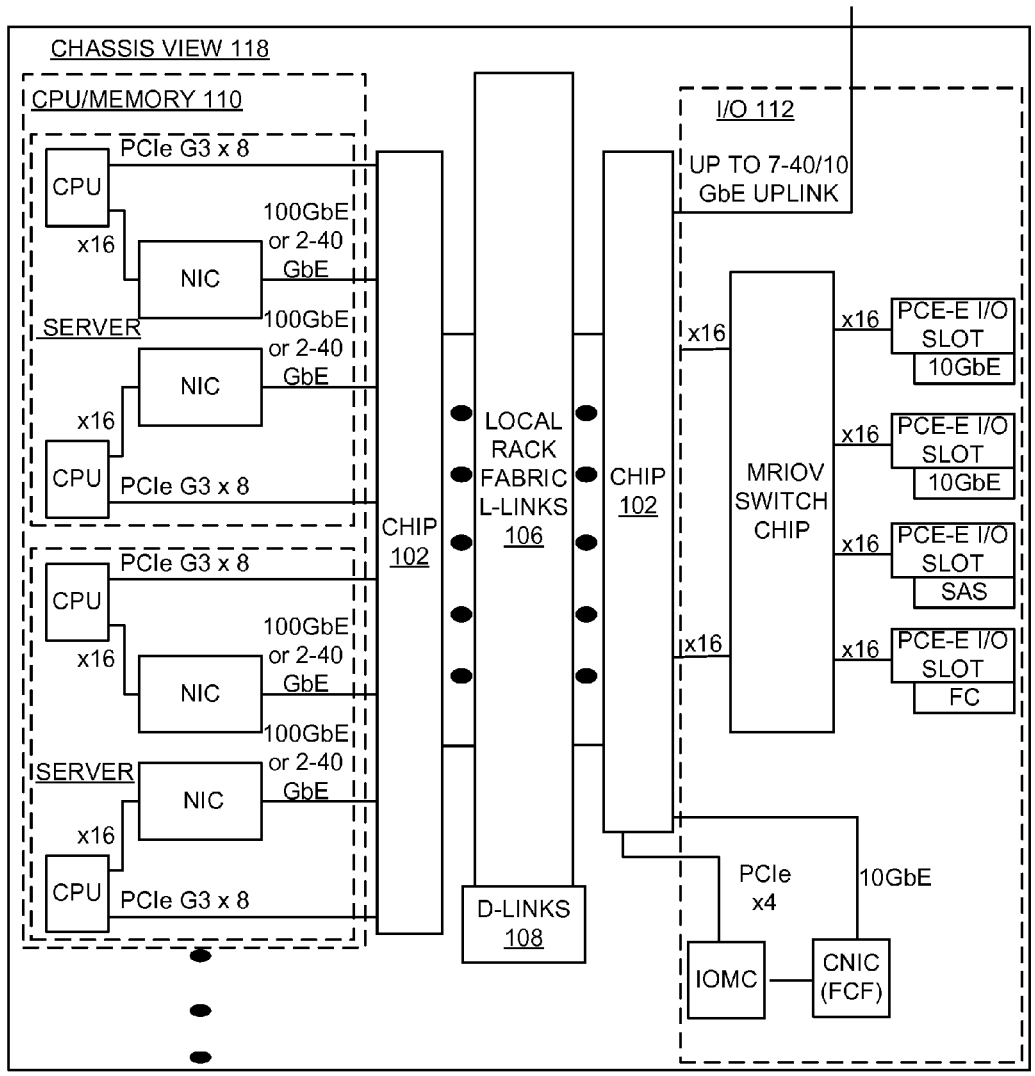
Figure 1D:
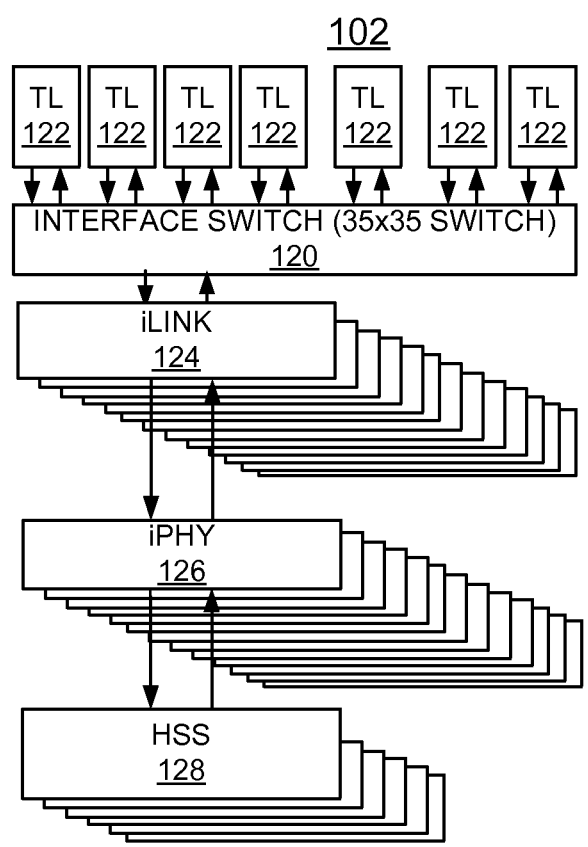
Figure 1E:
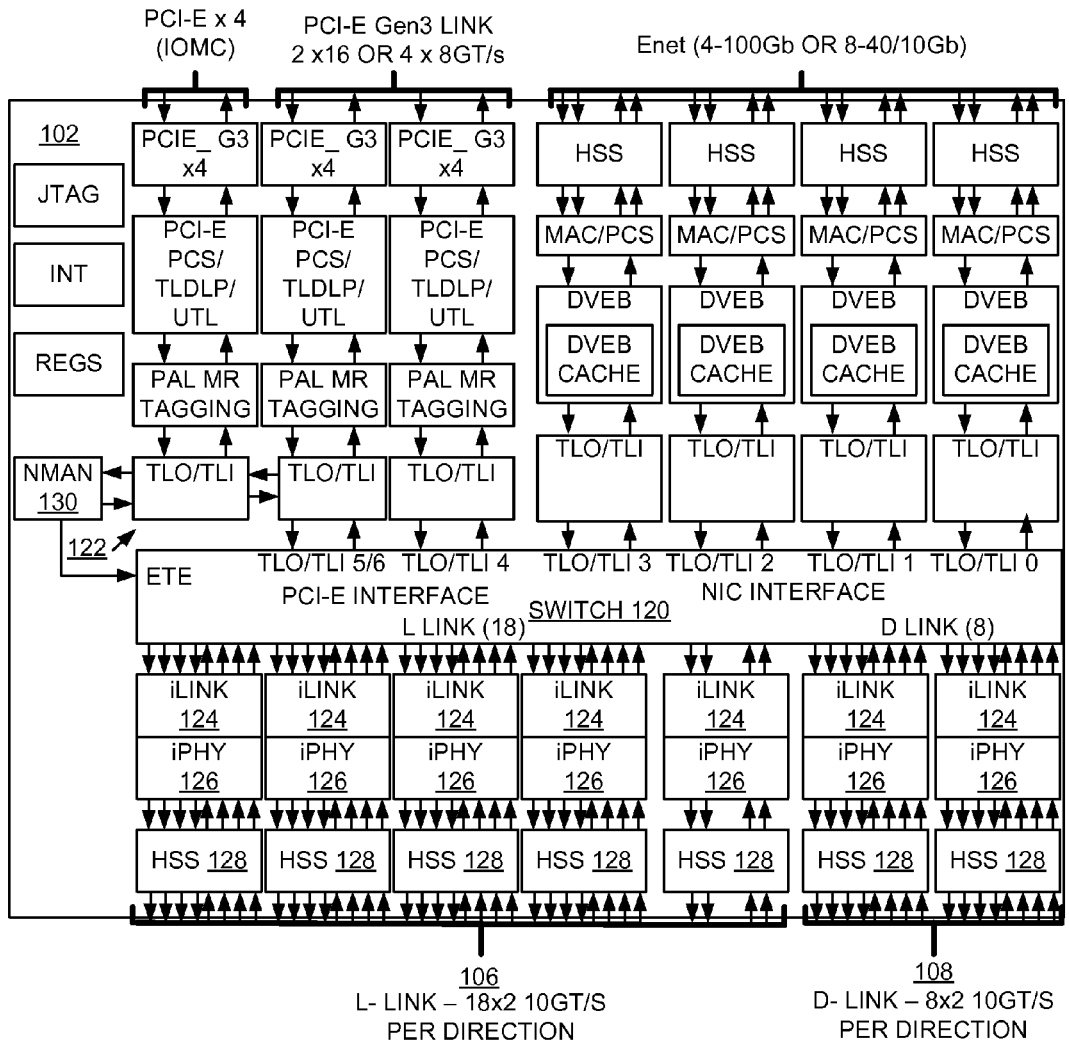

Referring also to FIG. 1E, each of the interconnect chips 102 of FIG. 1A includes, for example, 18 L-links 106, labeled 18 x2 10 GT/S PER DIRECTION and 8 D-links 108, labeled 8 x2 10 GT/S PER DIRECTION.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

Referring also to FIGS. 1B and 1C, multiple interconnect chips 102 defining a super node 104 are shown connected together in FIG. 1B. A first or top of stack interconnect chip 102, labeled 1,1,1 is shown twice in FIG. 1B, once off to the side and once on the top of the stack. Connections are shown to the illustrated interconnect chip 102, labeled 1,1,1 positioned on the side of the super node 104 including a plurality of L-links 106 and a connection to a device 110, such as a central processor unit (CPU)/memory 110. A plurality of D links 108 or eight D-links 108 as shown in FIG. 1A, (not shown in FIG. 1B) are connected to the interconnect chips 102, such as interconnect chip 102, labeled 1,1,1 in FIG. 1B.

As shown in FIG. 1B, each of a plurality of input/output (I/O) blocks 112, is connected to respective interconnect chips 102, and respective ones of the I/O 112 are connected together. A source interconnect chip 102, such as interconnect chip 102, labeled 1,1,1 transmits or sprays all data traffic across all L-links 106. A local I/O 112 may also use a particular L-link 106 of destination I/O 112. For a destination inside a super node 104, or chassis pair of first and second chassis group 105, a source interconnect chip or an intermediate interconnect chip 102 forwards packets directly to a destination interconnect chip 102 over an L-link 106. For a destination outside a super node 104, a source interconnect chip or an intermediate interconnect chip 102 forwards packets to an interconnect chip 102 in the same position on the destination super node 104 over a D-link 108. The interconnect chip 102 in the same position on the destination super node 104 forwards packets directly to a destination interconnect chip 102 over an L-link 106.

In the multiple-path local rack interconnect system 100, the possible routing paths with the source and destination interconnect chips 102 within the same super node 104 include a single L-link 106; or a pair of L-links 106. The possible routing paths with the source and destination interconnect chips 102 within different super nodes 104 include a single D-link 108 (D); or a single D-link 108, and a single L-link 106 (D-L); or a single L-link 106, and single D-link 108 (L-D); or a single L-link 106, a single D-link 108, and a single L-link 106 (L-D-L). With an unpopulated interconnect chip 102 or a failing path, either the L-link 106 or D-link 108 at the beginning of the path is removed from a spray list at the source interconnect 102.

As shown in FIGS. 1B and 1C, a direct path is provided from the central processor unit (CPU)/memory 110 to the interconnect chips 102, such as chip 102, labeled 1,1,1 in FIG. 1B, and from any other CPU/memory connected to another respective interconnect chip 102 within the super node 104.

Referring now to FIG. 1C, a chassis view generally designated by the reference character 118 is shown with a first of a pair of interconnect chips 102 connected a central processor unit (CPU)/memory 110 and the other interconnect chip 102 connected to input/output (I/O) 112 connected by local rack fabric L-links 106, and D-links 108. Example connections shown between each of an illustrated pair of servers within the CPU/memory 110 and the first interconnect chip 102 include a Peripheral Component Interconnect Express (PCIe) G3 x8, and a pair of 100 GbE or 2-40 GbE to a respective Network Interface Card (NIC). Example connections of the other interconnect chip 102 include up to 7-40/10 GbE Uplinks, and example connections shown to the I/O 112 include a pair of PCIe G3 x16 to an external MRIOV switch chip, with four x16 to PCI-E I/O Slots with two Ethernet slots indicated 10 GbE, and two storage slots indicated as SAS (serial attached SCSI) and FC (fibre channel), a PCIe x4 to a IOMC and 10 GbE to CNIC (FCF).

Referring now to FIGS. 1D and 1E, there are shown block diagram representations illustrating an example interconnect chip 102. The interconnect chip 102 includes an interface switch 120 connecting a plurality of transport layers (TL) 122, such as 7 TLs, and interface links (iLink) layer 124 or 26 iLinks. An interface physical layer protocol, or iPhy 126 is coupled between the interface links layer iLink 124 and high speed serial (HSS) interface 128, such as 7 HSS 128. As shown in FIG. 1E, the 7 HSS 128 are respectively connected to the illustrated 18 L-links 106, and 8 D-links 108. In the example implementation of interconnect chip 102, 26 connections including the illustrated 18 L-links 106, and 8 D-links 108 to the 7 HSS 128 are used, while the 7 HSS 128 would support 28 connections.

The TLs 122 provide reliable transport of packets, including recovering from broken chips 102 and broken links 106, 108 in the path between source and destination. For example, the interface switch 120 connects the 7 TLs 122 and the 26 iLinks 124 in a crossbar switch, providing receive buffering for iLink packets and minimal buffering for the local rack interconnect packets from the TLO 122. The packets from the TL 122 are sprayed onto multiple links by interface switch 120 to achieve higher bandwidth. The iLink layer protocol 124 handles link level flow control, error checking CRC generating and checking, and link level retransmission in the event of CRC errors. The iPhy layer protocol 126 handles training sequences, lane alignment, and scrambling and descrambling. The HSS 128, for example, are 7 x8 full duplex cores providing the illustrated 26 x2 lanes.

In FIG. 1E, a more detailed block diagram representation illustrating the example interconnect chip 102 is shown. Each of the 7 transport layers (TLs) 122 includes a transport layer out (TLO) partition and transport layer in (TLI) partition. The TLO/TLI 122 respectively receives and sends local rack interconnect packets from and to the illustrated Ethernet (Enet), and the Peripheral Component Interconnect Express (PCI-E), PCI-E x4, PCI-3 Gen3 Link respectively via network adapter or fabric adapter, as illustrated by blocks labeled high speed serial (HSS), media access control/physical coding sub-layer (MAC/PCS), distributed virtual Ethernet bridge (DVEB); and the PCIE_G3 x4, and PCIE_G3 2x8, PCIE_G3 2x8, a Peripheral Component Interconnect Express (PCIe) Physical Coding Sub-layer (PCS) Transaction Layer/Data/Link Protocol (TLDLP) Upper Transaction Layer (UTL), PCIe Application Layer (PAL MR) TAGGING to and from the interconnect switch 120. A network manager (NMan) 130 coupled to interface switch 120 uses End-to-End (ETE) small control packets for network management and control functions in multiple-path local rack interconnect system 100. The interconnect chip 102 includes JTAG, Interrupt Handler (INT), and Register partition (REGS) functions.

In accordance with features of the invention, a method and circuit for implementing electronic chip identification (ECID) exchange for network security in an interconnect system, and a design structure on which the subject circuit resides are provided. A network manager 130 on an interconnect chip 102 sends exchange identification (EXID) messages including an electronic chip identification (ECID) for the interconnect chip 102 across links to the other interconnect chips in the interconnect system 100. Each interconnect chip 102 includes a register storing the ECID for the interconnect chip, which is permanently stored on-chip and is unique. The ECID is used as a non-modifiable part of the security exchange. The received ECID is compared with a system list for the interconnect system 100 to verify validity of the sending interconnect chip 102. When the received ECID is identified as valid, a port enable configuration bit is written for the sending interconnect chip 100. When the received ECID is not identified as valid, the port remains disabled for the sending interconnect chip. An alert is sent to a console terminal or system management processor responsive to the received ECID being invalid.

In accordance with features of the invention, the ECID is permanently stored on-chip into electrically-programmable fuses during wafer test. The binary data is unique for the interconnect chip produced and is directly available as parallel outputs. Using this ECID, which is a unique, unchangeable chip identification as a non-modifiable part of the exchange ID provides an added security measure for the interconnect system 100.

Figure 2:
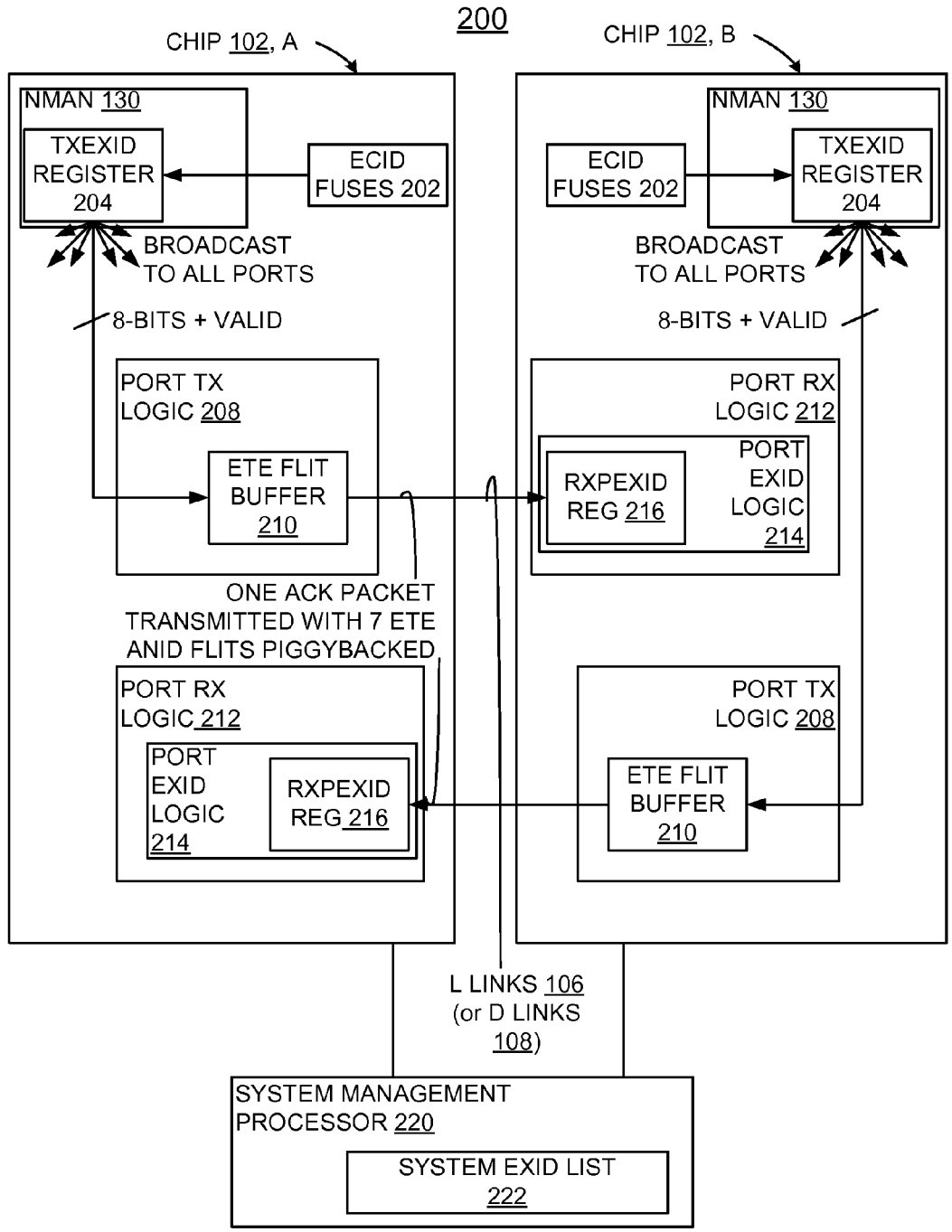
FIG. 2 is a schematic and block diagram illustrating a circuit for implementing electronic chip identification (ECID) exchange for network security in the interconnect system in accordance with the preferred embodiment.

Referring now to FIG. 2, there is shown a circuit generally designated by the reference character 200 for implementing electronic chip identification (ECID) exchange for network security in the interconnect system 100 in accordance with the preferred embodiment. Circuit 200 and each interconnect chip 102 includes a plurality of ECID fuses 202, as shown included in an illustrated pair of interconnect chips 102 of a first interconnect chip 102, A and a second interconnect chip 102, B. The ECID is permanently stored on-chip into the electrically programmable fuses 202, for example during wafer test for each interconnect chip 102. This binary ECID data 202 is unique for each chip 102 produced and is directly available as parallel outputs.

Circuit 200 and each interconnect chip 102 includes a network manager (NMan) 130 includes a transmit EXID (TXEXID) register 204 in accordance with the preferred embodiment.

Referring also to FIG. 3, there is shown an example predefined exchange identification (EXID) format generally designated by the reference character 300 for messages including the ECID 202 used for network security in the interconnect system 100 in accordance with the preferred embodiment. EXID format 300 includes a plurality of word 0-6, including chip ECID with words 4 and 5 being writeable by firmware (FW), as shown. Word 6 includes the interconnect Chip ID (8:0). FW writes the interconnect Chip ID (8:0) and the interconnect Chip ID (8:0) is required to be set prior to setting the TXEXID control valid bit in the TXEXID control register 204.

Referring to FIG. 2, the interconnect Chip ID (8:0) including the Chip ID 8-bits and valid bit is broadcast to all ports as indicated at a line connecting the TXEXID register 204 and a port transmit (TX) logic block 208. End-to-End (ETE) small control packets or flits are stored in an ETE flit buffer 210 of the port transmit (TX) logic block 208 until all ETE flit bytes, such as 28 bytes are ready to be transmitted. For example, one acknowledge (ACK) packet is transmitted with 7 ETE adjacent node ID (ANID) flits piggybacked, as indicated at the output of the ETE flit buffer 210.

Each network manager 130 transmits exchange identification across the links to the other chips 102 that are connected to the network 100 in accordance with the preferred embodiment. The network manager or NMan 130 uses End-to-End (ETE) heartbeats for identifying available links by sending ETE heartbeats across local links 106, 108 in the interconnect system 100. Upon FW writing a valid bit in the EXEXID control register 204, NMan 130 periodically transmits the TXEXID value on ports which have a good link heartbeat, but are also disabled.

Circuit 200 and each interconnect chip 102 includes a port receive logic 212 including a receive port EXID (RXPEXID) register 214. When the port receive logic 212 receives an EXID value with good CRC, it stores the EXID value in the RXPEXID register 214, and notifies FW.

A system management processor 220 including a system EXID list 222 is connected to each interconnect chip 102. FW checks the EXID value against the system list 222 and sets an RXPEXID valid status flag. A recoverable error is flagged with the RXPEXID valid status flag being set. While the RXPEXID valid status flag is set, the RXPEXID register 214 will not be modified or updated by HW. If the link heartbeat is lost, then HW resets the RXPEXID valid status flag. Once a port is enabled, HW stops trying to exchange EXID information, which will not be propagated across an enabled link.

Figure 4:
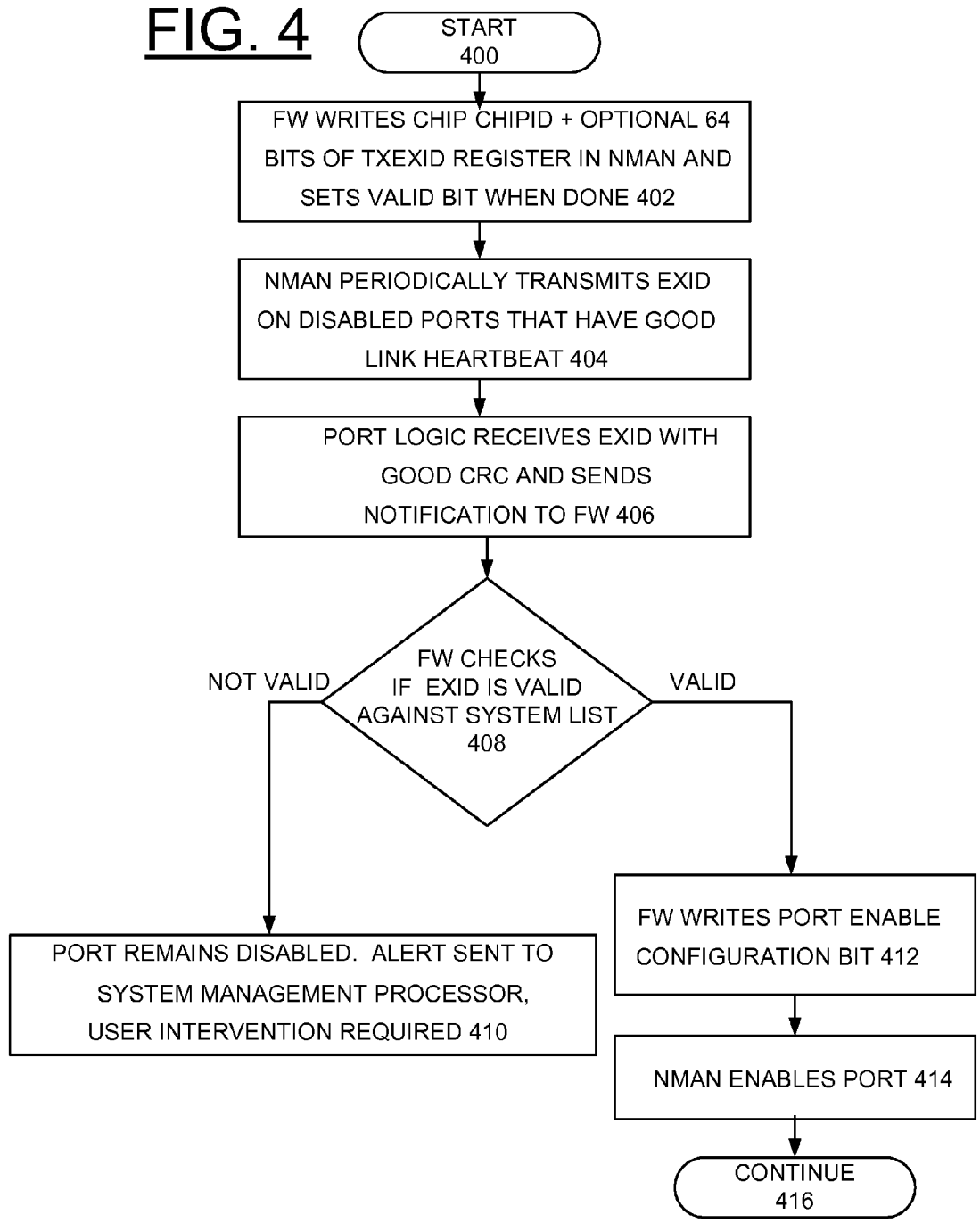
FIG. 4 illustrates exemplary operations performed by the circuit of FIG. 2 for implementing electronic chip identification (ECID) exchange for network security in an interconnect system in accordance with the preferred embodiment.

Referring now to FIG. 4, there are shown exemplary operations performed by the circuit 200 for implementing electronic chip identification (ECID) exchange for network security in accordance with the preferred embodiment starting at a block 400. As indicated at a block 402, firmware FW writes the interconnect chip ID to the EXEXID register 204 of the network manager 130 on the interconnect chip 102, and sets a valid bit when done.

In operation of circuit 200 in accordance with features of the invention, when the network manager 130 of a first interconnect chip 102, such as chip 102, A detects one or more disabled ports that have a good link heartbeat, the NMan 130 periodically transmit EXID on the disabled port having a good heartbeat as indicated at a block 404. Port logic 212 receives EXID with good CRC and sends notification to FW as indicated at a block 406.

As indicated at a decision block 408, FW checks if the EXID is valid against the system list 222. As indicated at a block 410, if the EXID is not valid, then the port remains disabled. An alert is sent to the system management processor 220; for example, user intervention is required. Otherwise if the EXID is valid, FW writes the port enable configuration bit as indicated at a block 412. The NMan 130 enables the port as indicated at a block 414. Then the operations continue at as indicated at a block 416.

Figure 5:
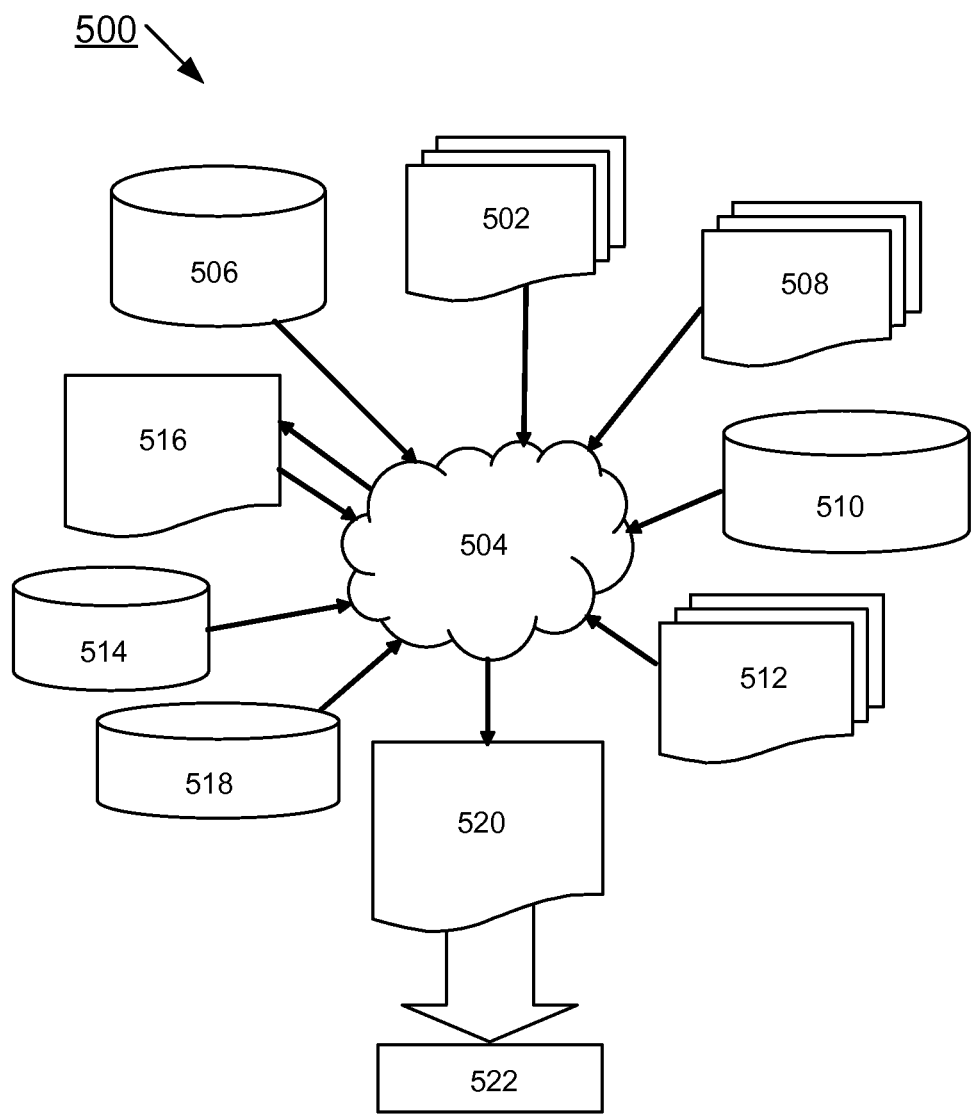
FIG. 5 is a flow diagram of a design process used in semiconductor design, manufacturing, and/or test.

FIG. 5 shows a block diagram of an example design flow 600 that may be used for circuit 200 and the interconnect chip 102 described herein. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuits 102, 200 in the form of schematics or HDL, a hardware-description language, for example, Verilog, VHDL, C, and the like. Design structure 502 may be contained on one or more machine readable medium. For example, design structure 502 may be a text file or a graphical representation of circuits 102, 200. Design process 504 preferably synthesizes, or translates, circuits 102, 20 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuits.

Design process 504 may include using a variety of inputs; for example, inputs from library elements 508 which may house a set of commonly used elements, circuits, and devices, including models, layouts, and symbolic representations, for a given manufacturing technology, such as different technology nodes, 32 nm, 45 nm, 90 nm, and the like, design specifications 510, characterization data 512, verification data 514, design rules 516, and test data files 518, which may include test patterns and other testing information. Design process 504 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 504 preferably translates an embodiment of the invention as shown in FIGS. 1A-1E, and 2-4 along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1A-1E, and 2-4. Design structure 520 may then proceed to a stage 522 where, for example, design structure 520 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing electronic chip identification (ECID) exchange for network security in a multiple-path local rack interconnect system, said method comprising:

storing on each interconnect chip an ECID for the interconnect chip, each said ECID being unique and unchangeable binary data and being permanently stored on each said interconnect chip; and each said ECID unique and unchangeable binary data being directly available as parallel outputs for each said interconnect chip;

providing a system management processor connected to each said interconnect chip and including a system list for the multiple-path local rack interconnect system;

each said interconnect chip including a network manager using End-to-End (ETE) small control packets for network management and control functions in the multiple-path local rack interconnect system;

said network manager of each said interconnect chip,
sending predefined exchange identification (EXID) messages including said ECID unique and unchangeable binary data across links to other interconnect chips in the interconnect system;
comparing a received EXID with said system list for the multiple-path local rack interconnect system to verify validity of the sending interconnect chip and for selectively enabling each said interconnect chip;
periodically transmitting said EXID messages across selected links to other interconnect chips in the interconnect system; said selected links including links to disabled ports having a good link heartbeat; and
responsive to the received EXID being identified as valid, writing a port enable configuration bit for the sending interconnect chip.

2. The method as recited in claim 1 wherein storing on each interconnect chip an ECID unchangeable binary data for the interconnect chip includes permanently storing said ECID into electrically-programmable fuses in each interconnect chip.

3. The method as recited in claim 1 includes responsive to the received ECID not identified as valid, maintaining the port for the sending interconnect chip as disabled, and sending an alert.

4. The method as recited in claim 1 includes providing port receive logic including port EXID logic receiving the EXID with good CRC and sending a notification for validity checking of the received EXID.

5. A circuit for implementing electronic chip identification (ECID) exchange for network security in a multiple-path local rack interconnect system including a plurality of interconnect chips, and a plurality of serial links connected between each of said plurality of interconnect chips; said circuit comprising:

each interconnect chip including an ECID for the interconnect chip, each said ECID being unique and unchangeable binary data and being permanently stored on each said interconnect chip; and each said ECID unique and unchangeable binary data being directly available as parallel outputs for each said interconnect chip;

a system management processor connected to each said interconnect chip and including a system list for the multiple-path local rack interconnect system;

each said interconnect chip including a network manager using End-to-End (ETE) small control packets for network management and control functions in the multiple-path local rack interconnect system;

said network manager of each said interconnect chip,
sending predefined exchange identification (EXID) messages including said ECID unchangeable binary data across said links to other interconnect chips in the interconnect system;
comparing a received EXID with said system list for the interconnect system to verify validity of the sending interconnect chip and for selectively enabling each said interconnect chip
periodically transmitting said EXID messages across selected links to other interconnect chips in the interconnect system; said selected links including links to disabled ports having a good link heartbeat; and
responsive to the received EXID being identified as valid, writing a port enable configuration bit for the sending interconnect chip.

6. The circuit as recited in claim 5 includes a plurality of electrically-programmable fuses in each interconnect chip permanently storing said ECID unchangeable binary data.

7. The circuit as recited in claim 5 includes port receive logic including port EXID logic receiving the EXID with good CRC and sending a notification for validity checking of the received EXID.

8. The circuit as recited in claim 5 includes firmware responsive to the received EXID not identified as valid, maintaining the port for the sending interconnect chip as disabled, and sending an alert.

9. A multiple-path local rack interconnect system comprising:

a plurality of interconnect chips;
a plurality of serial links connected between each of said plurality of interconnect chips;
each of said interconnect chips including an electronic chip identification (ECID) for the interconnect chip, each said ECID being unique and unchangeable binary data and being permanently stored on each said interconnect chip; and each said ECID unique and unchangeable binary data being directly available as parallel outputs for each said interconnect chip;
a system management processor connected to each said interconnect chip and including a system list for the multiple-path local rack interconnect system;
each said interconnect chip including a network manager using End-to-End (ETE) small control packets for network management and control functions in the multiple-path local rack interconnect system;
said network manager of each said interconnect chip,
sending predefined exchange identification (EXID) messages including said ECID unchangeable binary data across said links to other interconnect chips in the interconnect system;
comparing a received EXID with said system list for the interconnect system to verify validity of the sending interconnect chip and for selectively enabling each said interconnect chip
periodically transmitting said EXID messages across selected links to other interconnect chips in the interconnect system; said selected links including links to disabled ports having a good link heartbeat; and
responsive to the received EXID being identified as valid, writing a port enable configuration bit for the sending interconnect chip.

10. The multiple-path local rack interconnect system as recited in claim 9 includes a plurality of electrically-programmable fuses in each interconnect chip permanently storing said ECID unchangeable binary data.

11. A design structure embodied in a non-transitory machine readable medium used in a design process, the design structure comprising:

a circuit tangibly embodied in the non-transitory machine readable medium used in the design process, said circuit for implementing electronic chip identification (ECID) exchange for network security in a multiple-path local rack interconnect system, said circuit comprising:
each interconnect chip including an ECID for the interconnect chip, each said ECID being unique and unchangeable binary data and being permanently stored on each said interconnect chip; and each said ECID unique and unchangeable binary data being directly available as parallel outputs for each said interconnect chip;
a system management processor connected to each said interconnect chip and including a system list for the multiple-path local rack interconnect system;
each said interconnect chip including a network manager using End-to-End (ETE) small control packets for network management and control functions in the multiple-path local rack interconnect system;
said network manager of each said interconnect chip,
sending predefined exchange identification (EXID) messages including said ECID unchangeable binary data across said links to other interconnect chips in the interconnect system; and
comparing a received EXID with said system list for the interconnect system to verify validity of the sending interconnect chip and for selectively enabling each said interconnect chip,
periodically transmitting said EXID messages across selected links to other interconnect chips in the interconnect system; said selected links including links to disabled ports having a good link heartbeat; and
responsive to the received EXID being identified as valid, writing a port enable configuration bit for the sending interconnect chip, wherein the design structure, when read and used in the manufacture of a semiconductor chip produces a chip comprising said circuit.

12. The design structure of claim 11, wherein the design structure comprises a netlist, which describes said circuit.

13. The design structure of claim 11, wherein the design structure resides on storage medium as a data format used for the exchange of layout data of integrated circuits.

14. The design structure of claim 11, wherein the design structure includes at least one of test data files, characterization data, verification data, or design specifications.

* * * * *